Dec. 20, 1966  J. HENRY-BAUDOT  3,293,466
AXIAL AIRGAP ELECTRIC ROTARY MACHINES
Filed July 27, 1961

United States Patent Office 3,293,466
Patented Dec. 20, 1966

3,293,466
AXIAL AIRGAP ELECTRIC ROTARY MACHINES
Jacques Henry-Baudot, Antony (Seine), France, assignor to Printed Motors Inc., New York, N.Y.
Filed July 27, 1961, Ser. No. 127,206
Claims priority, application France, Aug. 3, 1960, 835,050
7 Claims. (Cl. 310—154)

The present invention concerns improvements in or relating to electric rotary machines of the axial airgap kind, wherein the disc-shaped rotor comprises a printed-circuit winding made of two sets of half-turn conductors intimately adhering to the opposite faces of an annular insulating carrier, said conductors being so shaped as to have the electrical pattern of the winding completed by mere face-to-face connections between the ends thereof.

It more particularly relates to the machines of the said kind wherein further the stator comprises at least one ring of permanent magnet poles on one side at least of said rotor winding and has for its object an improved structure of such an inductor member which ensures an important increase of the useful magnetic flux within the flat airgap of the machine.

In such a two-face printed-circuit winding, as shown for instance in FIG. 2 of the attached drawings, each half-turn conductor comprises an intermediate portion which is substantially radial and of the shape of a sector 11, extending on both outer and inner ends by further portions 12 and 13 which are preferably inclined or curved up to outer and inner terminal coatings 14 and 15 on the outer and inner peripheral portions of the insulating carrier. Said terminal coatings are used for the face-to-face connections, made for instance by metallizing holes through said coatings and said insulating material. Varied patterns may be used for such windings and, illustratively, the one shown in FIG. 2 is a series-wave winding comprising 41 turns for an eight-pole machine.

In a winding of such a kind, the parts of the conductors which are actually active from an electromagnetic point of view are the median portions 11 of the conductors, the ends of which serve the function of headspool conductors in conventional windings. Normally it suffices that the polar areas in the inductor be limited to the radial height of such portions of the half-turn conductors.

It has been previously proposed that in such machines the inductor structure be made of a ring of a highly coercive and remanent material such as those known as ferrites, whereon the magnetic poles have been previously "printed" by a magnetizing process. However, such inductor members have up to now been used only for small power machines as they have an insufficient magnetic flux in the airgap for higher power machines.

It is the object of the invention to avoid such a limitation and still take advantage of the employment of corecive ferrites or other highly coercive magnets in the inductor structures of the machines.

To this purpose, the invention provides a ring of inductor magnetic poles proper of a larger diameter and greater dimensions than the annular area of the active portions of the printed conductors in the winding, for instance the ring of permanent magnet poles is made at least equal to the annulus of the complete printed-circuit winding; and to mount upon such an enlarged ring pyramidal polar pieces ensuring the concentration of the magnetic flux to smaller areas which are actually useful for the operation of the winding. The ring of corecive ferrite may be made integral and the polar pieces applied against the printed magnetic poles on one face thereof, said poles being magnetized on the airgap side of the ring. In an alternative embodiment, the remanent coercive ring may be fragmented or segmented and in said ring alternate magnets and polar pieces protruding in tapered fashion with respect to the magnet levels for the said flux concentration, each magnet being magnetized on its radial faces instead of being magnetized on its airgap face. Instead of coercive ferrite, such a magnet material as the one known under the trademark of "Ticonal" may then be used. In both cases, the magnetic poles in the airgap are no longer contiguous but are separated by radial grooves for avoiding short circuits in the magnetic flux.

The gain which is thus obtained is important as will be seen from the following example which illustrates a particular case: For a winding disc having an outer diameter of 122 millimetres, the active area of the conductors in their radial parts is about 56.5 cm.$^2$. With a ring of coercive ferrite of such an annular area, with an inner diameter of 58 mm., and for an induction of a value of 2500 gauss, in a eight-pole machine, the magnetic flux for each pole has an intensity of about 16,500 gauss (the computation actually gives 17,700 gauss but one has to take into account the fact that the magnetized poles are not absolutely jointive on the ring). Preserving said area of 56.5 cm.$^2$ for the areas of the pyramidal polar pieces neighbouring the winding surface in the airgap, but increasing the outer diameter of the ferrite ring up to 122 mm. and decreasing the inner diameter of the ring up to 45 mm., the useful surface on said ring is about 100 mm.$^2$. Under conditions stated above, this gives for each pole a magnetic flux of about 25,000 gauss in the airgap. Making use of "Ticonal" will double this flux value for the same useful magnetization area.

The invention will be explained in more detail with reference to the accompanying drawings, wherein:

FIG. 1 shows a cross-section view of an embodiment of the invention;

FIG. 2, as said, shows a view of an example of printed circuit winding for the machine of FIG. 1;

These examples are merely illustrative and from them any further alternatives may be deduced without departing from the spirit and scope of the present invention.

Figure 1:
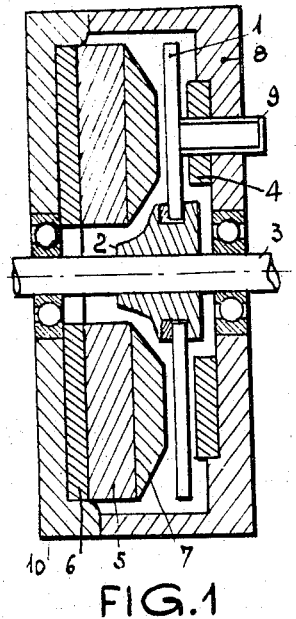
Figure 2:
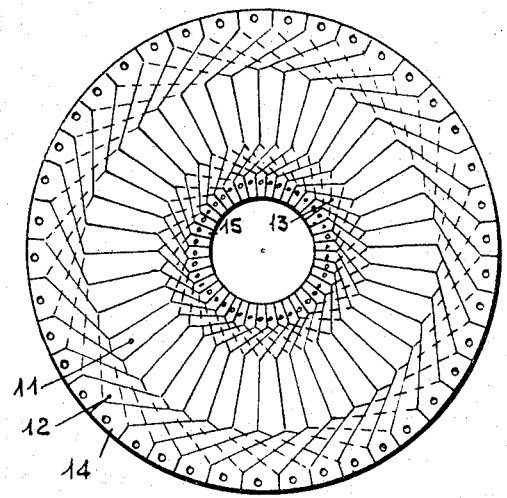

The machine shown in FIG. 1 is a D.C. motor comprising a rotor 1 constituted by a printed-circuit winding of the kind of FIG. 2. Said rotor 1 is mounted by a hub 2 on a shaft 3 and cooperates with two stator members one of which, 4, is a mere magnetic yoke for closing the magnetic flux passing through the winding. Said yoke 4 is carried by a mounting plate 8. The other stator member on the opposite side of rotor 1 comprises eight inductor poles and is made according to the present invention.

Figure 3:
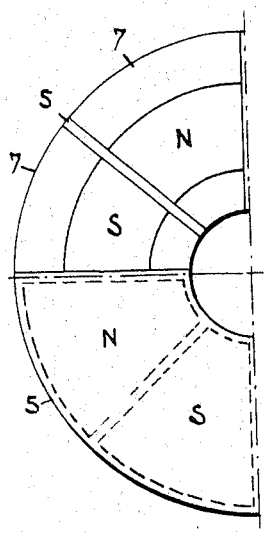
FIG. 3 shows a half-view of the inductor structure of the embodiment of FIG. 1.

Said inductor comprises a coercive ferrite ring 5 wherein, as shown on the lower part of FIG. 3, magnetic poles have been permanently magnetized. The magnetization is parallel with the axis of the ring so that on the rear face of the ferrite ring appear poles of opposite polarity from those on the airgap face of the ring. There is for instance a series of eight magnetic poles of alternate polarities N and S on the ring 5. A magnetic yoke ring 6 is preferably applied on the rear of the ring 5. On the front face of the ring 5 are provided polar pieces 7 the cross-section of which is clearly visible on FIG. 1 and the radial cutting or shape is shown in FIG. 3, upper part thereof. It is clear that from the provision of such pieces 7, made of a soft magnetic material, the magnetic flux is concentrated for each pole on an airgap pole surface the radial height of which corresponds to the radial height of the active portion of the conductors in FIG. 2. The inductor structure is supported by a mounting plate 10.

Brushes such as indicated at 9 cooperate with the winding, for instance passing through the magnetic yoke 4 of the machine.

Figure 4:
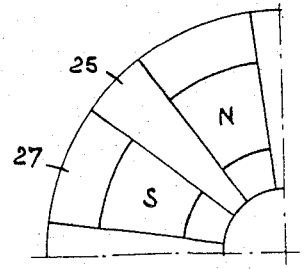
FIG. 4 is a view of a partial alternative embodiment of the invention.
Figures 5, 6:
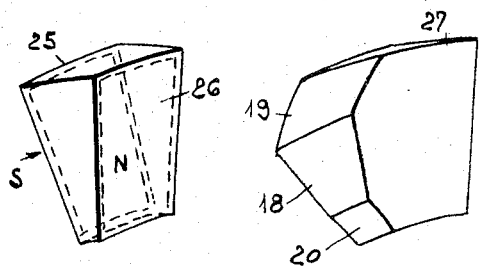
FIGS. 5 and 6 respectively showing perspective views of the parts comprised in such an alternative inductor structure of FIG. 4.

In an alternative embodiment, the stator inductor structure of FIG. 1 may be replaced by the structure disclosed in relation with FIGS. 4 to 6. The inductor ring is made of alternate magnets and polar pieces, 25 and 27, shown in perspective views on FIGS. 5 and 6, respectively. The magnets 25 are in the shape of sectors and are magnetized for presenting their poles N and S on the major faces 26 and the polar pieces are shaped for presenting in the airgap a protruding portion of pyramidal shape ending in an airgap area 18 of the radial height equal to that of the radial height of the active parts of the winding conductors. Inclined faces 19 and 20 ensure the shaping of said polar pieces from their rear sector-shaped parts up to said planar areas 18. Finally, the inductor structure has the same effects as the one of FIGS. 1 and 3. The rear magnetic ring 6 of FIG. 1 is omitted in FIGS. 4 to 6.

It is not at all imperative that the polar pieces are made of a shape ending in a substantially trapezoidal area and they may be so shaped, on the other hand, to conform to any varied shape of the turns in the printed-circuit winding, for instance when said turns are provided with slanted and/or curved conductor patterns as disclosed in my co-pending application No. 1128, filed January 7, 1960, now Patent No. 3,144,574. Further the invention may be used in relation with other winding patterns than those above described or referred to, as are known in the printed-circuit winding techniques. For putting the invention into practice, in any case, the condition is always that an inductor pole ring is provided with a radial dimension higher than that of the active height of the printed-circuit winding and pole pieces are provided for conveniently concentrating the magnetic pole flux from such higher dimension area to the lower and useful dimension of the active area of the said winding.

What is claimed is:

1. An axial airgap electric rotary machine comprising a disc-shaped printed-circuit winding made of conductors intimately adhering on one face at least of an insulating annular carrier on the airgap face thereof, said winding having an active part formed of substantially radial conductor portions cooperating with at least one magnetic pole ring, said pole ring being formed of coercive magnetic material permanently magnetized to present magnetic poles of opposite polarities in alternate areas of the air-gap face of said ring, said pole ring having a radial height greater than that of the active part of the winding, and magnetic polar pieces of magnetically soft material mounted on the magnetized areas of said pole ring, the faces of said polar pieces which engage said ring having a radial height substantially equal to that of the permanent magnet ring, and said polar pieces having airgap faces adjacent said winding of a radial height substantially equal to the radial height of the active part of said winding.

2. An axial airgap printed-circuit winding machine according to claim 1, wherein the said ring is made of an integral ring of coercive magnetic material wherein magnetic poles have been permanently magnetized on the airgap face, and the polar pieces, formed of soft magnetic material, are in contact with the airgap face of said integral coercive material ring.

3. An axial airgap printed-circuit winding machine according to claim 1, wherein a ring of soft magnetic material is in contact with the rear face of said coercive material ring with respect to the airgap.

4. An axial airgap printed-circuit winding machine, according to claim 1, wherein the inductor ring is made of alternating permanent magnets of coercive material with poles magnetized on the lateral faces thereof, and pyramidal polar soft magnetic material pole pieces protruding with respect to the magnets on the airgap side of the structure, said magnets and said pole pieces being sector-shaped and forming a complete ring.

5. An axial airgap printed-circuit winding machine according to claim 1, wherein said pole pieces are of trapezoidal shape in their end surfaces in the airgap.

6. An axial airgap printed-circuit winding machine according to claim 1, wherein said pole pieces are of end face shapes in the airgap conforming to the very shapes of the conductor turns in said printed-circuit winding.

7. A magnetic field structure according to claim 1 wherein said pole projections are tapered in form so that their outer pole faces are of smaller area than the area of the respective ring sectors.

References Cited by the Examiner
UNITED STATES PATENTS

| | | | |
|---|---|---|---|
| 2,193,406 | 3/1940 | Goss et al. | 310—218 |
| 2,722,617 | 11/1955 | Cluwen et al. | 310—154 |
| 2,773,239 | 12/1956 | Parker | 310—268 |
| 2,970,238 | 1/1961 | Swiggett | 310—268 |
| 3,093,763 | 6/1963 | Sargeant et al. | 510—154 |
| 3,239,705 | 3/1966 | Kavanaugh | 310—154 X |

MILTON O. HIRSHFIELD, *Primary Examiner.*

DAVID X. SLINEY, RICHARD M. WOOD, MAX L. LEVY, *Examiners.*

P. L. McBRIDE, D. F. DUGGAN, *Assistant Examiners.*